Patented Aug. 11, 1925.

1,548,938

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed July 7, 1922. Serial No. 573,461.

*To all whom it may concern:*

Be it known that I, EDWARD S. FARROW, Jr., a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong flowable solutions of cellulose ether and also relates to the cellulose ether compositions produced by the aid of such solvents. One object of my invention is to provide a solvent which will dissolve large proportions of cellulose ethers and at the same time yield solutions having a regulated viscosity for use in plastic and film making arts. Another object of my invention is to provide a cellulose ether solution, which has a regulated viscosity, for making strong, flexible, transparent film on the machines and by the methods known in the art.

In U. S. Patent No. 1,188,376, Lilienfeld, June 20, 1916, there are disclosed a series of alkyl ethers of cellulose. Certain of these are practically insoluble in water, and my invention is particularly applicable to ethers having that property, although not limited to them. Such ethers form strong and useful solutions in mixtures of methyl acetate and methyl alcohol. Nevertheless it is sometimes desirable to reduce the viscosity of such solutions, in order to regulate them for film manufacture, without substantially diluting them.

I have discovered that such regulation of the viscosity may be effected by adding small amounts of acetanilid to the mixture of methyl acetate and methyl alcohol. Acetanilid by itself does not have as much solvent action on cellulose ether as a mixture of methyl alcohol and methyl acetate. The addition of small amounts of it to such mixture would not, therefore, be expected to have a lowering effect on the viscosity of the resulting solution of cellulose ether. But an amount of acetanilid equal to one-seventieth of the weight of the methyl acetate and methyl alcohol mixture, for example, will lower the viscosity of a thick solution of cellulose ether in such mixture by about 15 to 20 per cent. This surprising action indicates that the acetanilid has a strong latent solvent power which is made active under these circumstances.

The proportions may vary considerably, but I find that a solution containing 1 part by weight of acetanilid to 70 parts of the mixture of methyl acetate and methyl alcohol is particularly useful, yet any dilution of the solution is negligible. The mixture of the acetate and alcohol may vary also, but I prefer to use the ratio of 90 parts by weight of the former to 10 parts by weight of the latter.

The amount of cellulose ether dissolved in the complete viscosity-regulating solvent may, of course, be considerably varied. By way of example, I may dissolve 1 part of water-insoluble ethyl cellulose in from 3 to 6 parts of the mixed solvent.

It will be noted that some of the acetanilid remains in the finished film formed by flowing or depositing such dopes in the usual way. Other substances which impart additional suppleness or incombustibility, or other qualities to the film may be added to the above solutions or dopes, such modifying agents being, for instance, triphenyl or tricresyl phosphate, camphor, monochlornaphthalene, etc.

The ingredients are of the ordinary commercial type sufficiently purified for the process of film manufacture, so as to give dopes yielding films having the proper relative freedom from color.

Having thus described my invention, what I claim as new and desire to secure by Letters Patent is:

1. A composition of matter comprising cellulose ether dissolved in a mixture of methyl alcohol, methyl acetate and acetanilid.

2. A flowable film-forming composition comprising an alkyl ether of cellulose dissolved in a mixture of methyl alcohol, methyl acetate and acetanilid, the weight of the latter being approximately one-seventieth the combined weights of the methyl acetate and methyl alcohol.

3. A composition of matter comprising a solution of 1 part by weight of water-insoluble ethyl cellulose in from 3 to 6 parts of a mixture of methyl alcohol, methyl acetate and acetanilid.

4. A flowable composition of matter of relatively low viscosity, comprising the ingredients of a cellulose ether composition of at least 15% higher viscosity and sufficient acetanilid to reduce said higher viscosity to said low viscosity.

Signed at Rochester, New York, this 30 day of June 1922.

EDWARD S. FARROW, Jr.